United States Patent [19]

Fox

[11] 3,924,301

[45] Dec. 9, 1975

[54] CONTROL ACTUATOR FOR GEAR BELTS AND THE LIKE

[75] Inventor: Edward I. Fox, Chicago, Ill.

[73] Assignee: H. W. Crane Company, Maywood, Ill.

[22] Filed: July 15, 1974

[21] Appl. No.: 488,293

[52] U.S. Cl. ................................. 24/31 L; 24/31 H
[51] Int. Cl.² ............................................. F16G 3/02
[58] Field of Search............ 74/231 R, 231 J, 231 P, 74/231 CB, 231 M; 24/31 H, 31 L, 265 AL, 38

[56] References Cited
UNITED STATES PATENTS

| | | | |
|---|---|---|---|
| 81,331 | 8/1868 | Beardsley............................. | 24/31 H |
| 3,203,067 | 8/1965 | Elsner................................ | 24/265 AL |
| 3,591,866 | 7/1971 | Jensen............................... | 24/31 L X |
| 3,744,095 | 7/1973 | Tomlinson ..................... | 74/231 J X |

*Primary Examiner*—Donald A. Griffin
*Attorney, Agent, or Firm*—John F. McCanna

[57] ABSTRACT

This invention relates to control actuators for application to belts or the like, particularly to belts having on one side alternating ribs and grooves. The invention is characterized by the provision of an actuator of novel construction which serves to connect the end portions of a belt in overlapping relation whereby to make a single belt, or to pull the end portions into such overlapping relation as to take up slack in the belt, or to provide a predetermined belt length. The actuator is used with mechanisms requiring control actuation by lengthwise movement of the belt. The invention also is a belt connector for connecting two end portions of a belt apart from the actuating function.

1 Claim, 10 Drawing Figures

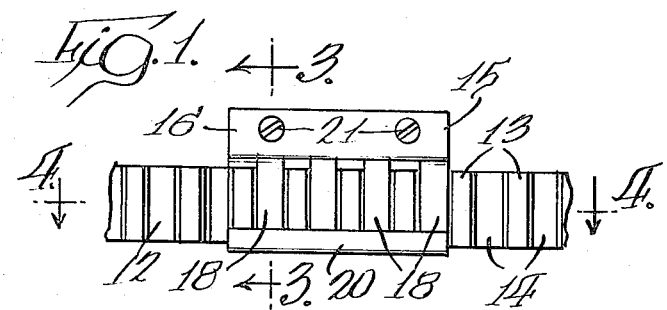
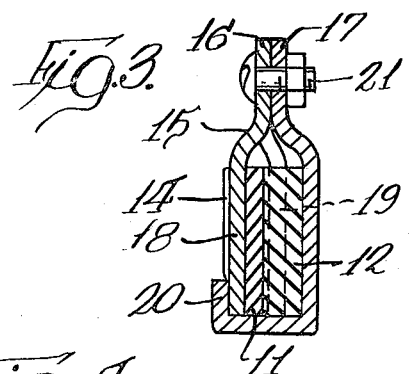
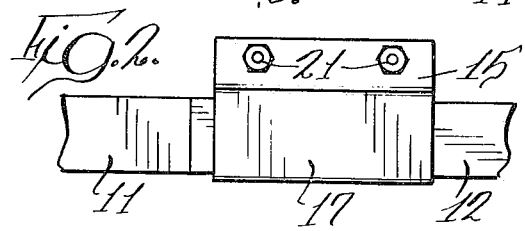
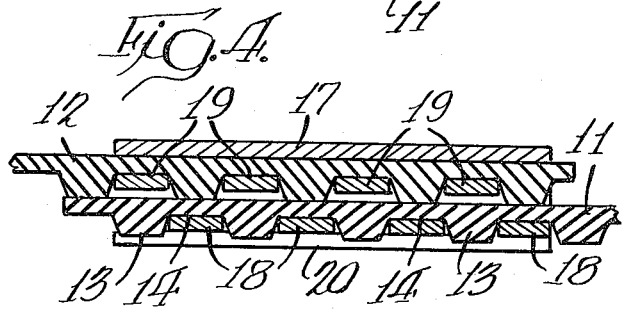
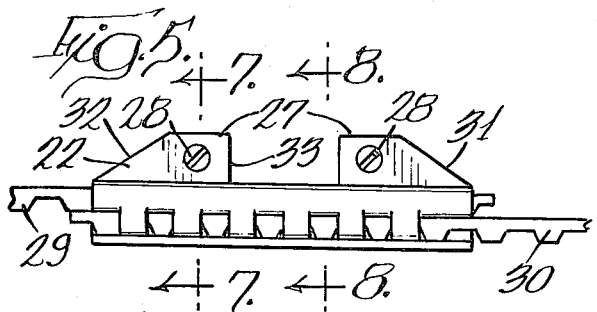
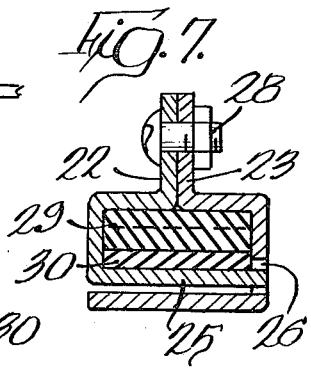
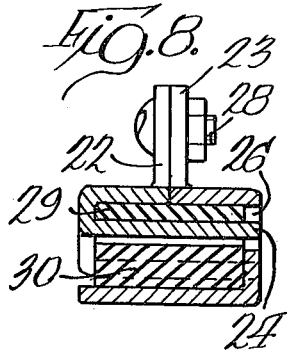
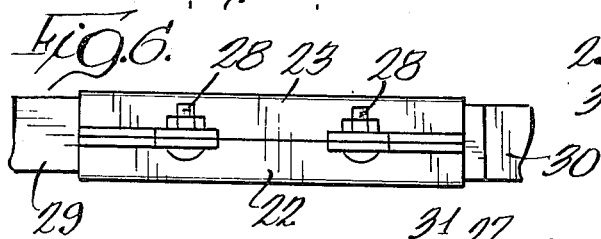
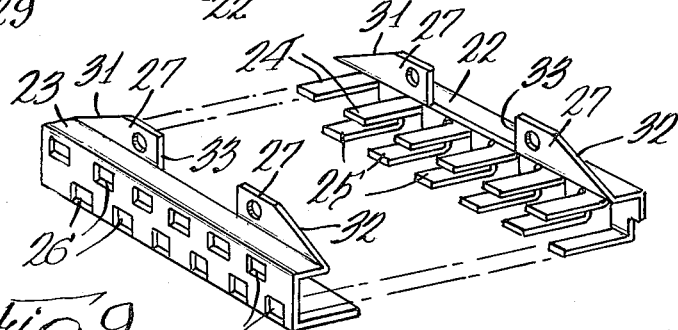
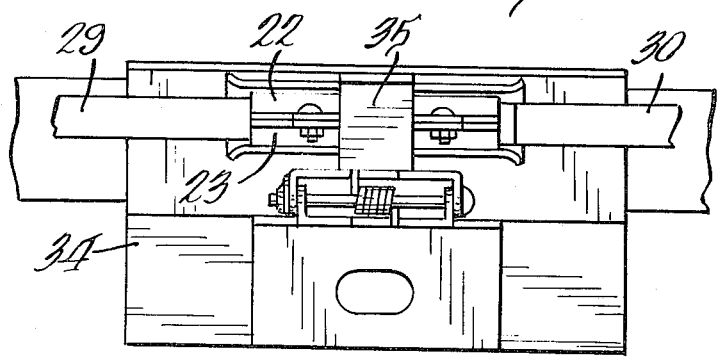

CONTROL ACTUATOR FOR GEAR BELTS AND THE LIKE

An object of my invention is to provide a control actuator of novel construction whereby to obtain accurate and dependable operation of mechanisms requiring control at predetermined times in the lengthwise movement of a belt or the like.

Another object is to provide novel means for quickly connecting the end portions of a belt in overlapping relation to make a single belt, or to take up slack in the belt, or to adjust the belt to a desired length.

Referring to the drawings:

FIG. 1 is a side view of one embodiment of my invention applied to a gear type belt, looking at the top side of the belt;

FIG. 2 is a view of the side opposite from FIG. 1;

FIG. 3 is an enlarged sectional view taken on the section line 3—3 of FIG. 1;

FIG. 4 is a sectional view taken on the section line 4—4 of FIG. 1;

FIG. 5 is a side view of a modified form of my invention;

FIG. 6 is a top view of FIG. 5;

FIGS. 7 and 8 are enlarged sectional views taken on the section lines 7—7 and 8—8, respectively, of FIG. 5;

FIG. 9 is a perspective view of the embodiment starting with FIG. 5, showing the actuator parts in separated relation; and FIG. 10 is a top view of the actuator in this second embodiment applied to a control mechanism shown in a patent application of mine identified herein below.

Referring to the embodiment shown in FIGS. 1 to 4, it will be noted that this is a connector for connecting together two end portions 11 and 12 of a belt in overlapping relation. However, the connector might also be used as a control actuator. The belt, of flexible material, is of the type which is smooth on one side and has alternating transverse ribs 13 and grooves 14 on the opposite side. The belt-connecting means designed generally by 15 comprises opposite sides 16 and 17 of sheet material. The side 16 has integral therewith a plurality of fingers 18 shaped to fit into grooves 14 in the belt portion 11. The opposite side 17 also has integral therewith similar fingers 19 but arranged to fit into grooves in the belt portion 12. The fingers 18 and 19 are in alternating relation as shown in FIG. 4. The side 17 is formed at one edge to extend cross-wise of the belt and upwardly as at 20 to engage the fingers 18 and the ribs at this side of the belt to hold the parts in this assembled relation. Suitable means such as screw bolts 21 pass through the sides 16 and 17 and clamp the parts in said assembled relation. The connecting means 15 when thus assembled, holds the belt end portions 11 and 12 fixed together as a single belt. By loosening or removing the screw bolts 21 one or both of the belt end portions 11 and 12 may be shifted into a different set of grooves for the purpose of taking up slack in the belt, or to change the overall length of the belt. The connecting means 15 may also serve as a control actuator; and in this function the sides connected together by the screw bolts may be shaped to provide actuating surfaces as shown in the embodiment described below.

The embodiment shown in FIGS. 5 to 10 has opposite side members designated generally by 22 and 23. In this embodiment one side member 22 is shaped to provide a plurality of fingers 24 in one plane and another plurality of fingers 25 in another plane and alternating with the fingers 25, as shown in FIG. 9. This distinguishes from the first described embodiment in that the fingers 24–25 are in planes at right angles to the projecting side portions which are screw clamped together. Also, the fingers 24–25 are formed on only one side member whereas in the first embodiment the fingers 18–19 are on the side members 16 and 17. In this second embodiment the side member 23 has openings 26 arranged to register with and receive the ends of the fingers 24–25 when the side members are assembled and clamped together. Each side member has upstanding portions 27 in longitudinal alignment and arranged to be clamped one to the other by screw bolts 28. The parts are so proportioned that when these screw bolts are tightened the side members will be clamped to the interposed end portions 29 and 30 of the belt. The belt and end portions are the same as in the first described embodiment. The second embodiment can serve both as a belt connector and a control actuator. As a control actuator the upstanding portions 27 are shaped to provide cam surfaces 31 and 32 and an intermediate locking recess 33. This actuator is adapted for use with a mechanism for opening and closing garage doors, in which the lengthwise movement of the belt 29–30 moves the actuator to perform the actuating function. FIG. 10 is a top view from U.S. patent application Ser. No. 470,669 (in which I am a joint inventor) for a door operating mechanism. In this mechanism a door-moving trolley 34 has pivotally mounted thereon a latch 35 which is movable on its pivot into and out of the locking recess 33. As shown in FIG. 10 the trolley 34 is locked to the belt 29–30 by the latch 35 and the trolley will be moved by and with the belt until unlatched therefrom by means having no part of the present invention.

I claim:

1. A belt connector adapted for application to a belt having transverse alternating ribs and groves, comprising a member shaped to provide fingers adapted to be inserted into grooves of the belt to locate said member at an operative position on the belt, and means for clamping the finger member to the belt to hold the finger member in said operative position, in which the connector member comprises opposed side parts positioned at opposite sides of the belt, and screw means for clamping said side parts to the interposed belt.

* * * * *